United States Patent

Lukasczyk

[11] 3,812,594
[45] May 28, 1974

[54] GAUGE FOR SHIFTABLE SYNCHRONIZING SWIVEL JOINTS
[75] Inventor: Hans Lukasczyk, Wolfsburg, Germany
[73] Assignee: Volkswagenwerk Aktiengesellschaft, Wolfsburg, Germany
[22] Filed: Sept. 21, 1971
[21] Appl. No.: 182,510

Related U.S. Application Data
[63] Continuation-in-part of Ser. No. 837,154, June 27, 1969, abandoned.

[52] U.S. Cl. .......................... 33/174 R, 33/178 R
[51] Int. Cl. .................... G01b 5/00, G01b 5/08
[58] Field of Search ........... 33/172 E, 174 R, 172 E, 33/172 B, 178 R

[56] References Cited
UNITED STATES PATENTS
2,642,672   6/1953   Lewis et al. .................. 33/178 R
2,849,801   9/1958   Kustusch ...................... 33/178 R FOREIGN PATENTS OR APPLICATIONS
188,026   12/1966   U.S.S.R. ..................... 33/172 E Primary Examiner—Robert B. Hull
Assistant Examiner—Richard R. Stearns
Attorney, Agent, or Firm—Watson, Cole, Grindle & Watson

[57] ABSTRACT

A device for the classification of shiftable synchronizing swivel joints having a housing in which a guide bolt with a cone is axially shiftable in the housing and a plurality of ball shaped contact feelers are disposed in grooves in the joint element and a dial gauge is connected to the device to measure the arithmetic mean of the dimensions of the grooves.

5 Claims, 4 Drawing Figures

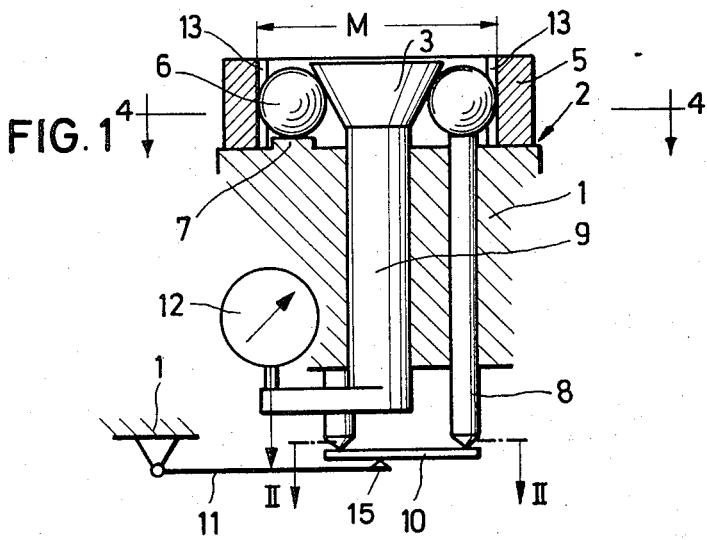
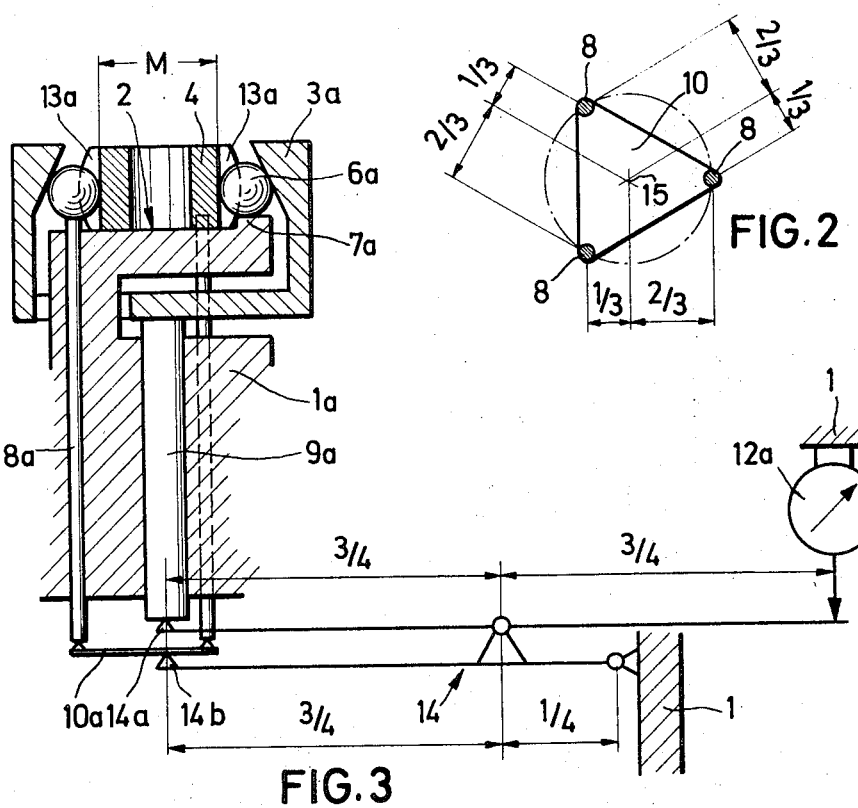

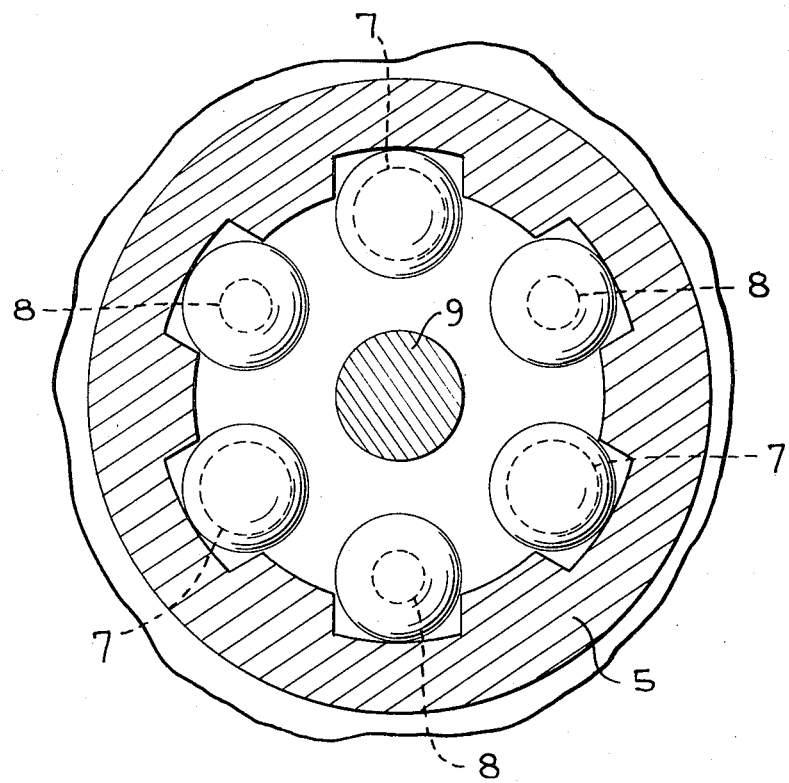

GAUGE FOR SHIFTABLE SYNCHRONIZING SWIVEL JOINTS

This application is a continuation-in-part of my prior copending application, now abandoned, Ser. No. 837,154, filed June 27, 1969.

This invention relates to a device for the classification of shiftable synchronizing swivel joints with six engaging balls distributed evenly over the periphery thereof.

In automobile construction, the shiftable synchronizing swivel joints with six engaging balls and have been gaining ground increasingly as a driving joint or transmission. The fit required between the joint elements, ball hub or sleeve ball, and joint member, cannot be achieved in the customary finishing process directly. For the mounting of the joints, therefore, the dimensions of width for the groove is important for its function, that is, the distances between the opposing grooves of each part of the joint must be measured precisely. The average value of the measurement which is determined through the arithmetic mean from the actual sizes of the widths of the three pairs of ball races (measure M), is characteristic for a predetermined class (range of tolerance) which then is impressed into the joint element. A ball hub and a joint element of the same class can thus be easily paired, as a result of which a jamming of the cooperating parts or an unduly great play between them will be avoided. For measuring the joint elements and for the determination of the matching groups hitherto two methods have been known. In the case of one of these methods, the individual widths of the three pairs of ball races are measured on a proper measuring instrument and the class is calculated by averaging the values. This method can be used merely in small scale production.

In the case of the other method, the widths of the three pairs of ball races are measured electronically with a corresponding measuring device, are then averaged, and are inserted in a stamping device. This type of determination of the class is quite generally customary in mass production, but it is relatively expensive because of the complicated tools which, therefore, are also subject to breakdowns.

It is an object of the invention to avoid these disadvantages in the case of a device of the species mentioned in the beginning, by the fact that a cone, mounted axially shiftably in a housing, fits against six ball-tipped contact feelers arranged in the grooves of a part of the joint, which rest alternatingly on a support of the workpiece for the joint element or on sliding pestles which are of equal length, are supported by a plate, and are parallel to the axis of the cone whereby a differential lever system articulated to the housing fits with the ends of its levers against the cone, and in the prolongation of the axis of the cone against the plate and which has lever conditions for a dial gauge, which make possible the measurement of the arithmetic mean of the dimensions of width of the groove pertaining to the position of the cone and the plate.

For the purpose of simplification of the measuring method, the diameter of the ball-tipped contact feelers corresponds to that of the engaging balls and the angle of the cone has been chosen in such a way that upon a shifting of the cone, its shifting path and the change in distance of two opposing ball-tipped contact feelers from one another, are equally large.

At the same time, advantageously, the cone will rest on a guide bolt disposed in the axis of said cone which bolt extends into the vicinity of the plate and serves with its end as a supporting surface for the one end of the lever of the differential lever system.

In order to be able to adjust the device precisely, a measuring anvil has been provided between every ball-tipped contact feeler and the support of the work piece.

The arrangement according to this invention is suitable despite its mechanical method of operation for measurements of mass production whereby for the control of a corresponding stamping instrument, a customary contact dial gauge may be sufficient. Further advantages of the invention are to be found in the high degree of precision of the instrument, its simplicity and sturdiness. The costs for the tools amount merely to a fraction of the electronically controlled tools.

Further objects will be apparent from the following description when considered in connection with the accompanying drawings in which:

FIG. 1 is a sectional view of an embodiment of the invention for use in measuring the external or outer joint members of driving joints;

FIG. 2 is a section taken on Line II—II of FIG. 1, in the direction of the arrows;

FIG. 3 is a sectional view of a second embodiment of the invention for use in measuring the internal joint members or ball sleeves;

FIG. 4 is a plan section on the line 4—4 of FIG. 1.

Referring now in detail to the structure shown in FIG. 1, the device consists of a housing 1 provided with a support 2 for the joint element or workpiece for a part of the joint in which housing a cone 3, has been mounted in an axially shiftable manner by means of a guide bolt or pin 9, which cone has been developed as an inside cone for the measurement of the ball sleeve 4 in the embodiment of FIG. 3 and as an external conical surface for the measurement of the work piece or joint element 5. Furthermore, six ball-tipped contact feelers 6 (FIG. 4), whose diameter corresponds to the engaging balls, are disposed on the housing 1 evenly distributed around the axis of the cone, three of which are disposed each time at 120° on a measuring anvil 7 each and are radially as well as tangentially movable. Further, as shown in FIG. 1, the intermediary three ball-tipped contact feelers 6, which are likewise freely movable, are supported by means of a sliding pestle or tappet 8, each running parallel to the axis of the cone, on a triangular-shaped plate 10 with even sides, in the middle 15 of which (as shown in FIG. 1) a measuring lever 11 fulcrumed on the housing 1, engages at 15. A dial gauge 12 attached to the guide bolt 9 is connected to the measuring lever 11 in the middle and by indicating the vertical position of the mid-point 15 of the plate 10, shows the arithmetic mean of the widths of pairs or diametrical distances between bottoms of the three grooves.

As shown in FIG. 4, there are three pairs of diametrically opposed balls 6—6. One ball of each pair rests on the fixed anvil or supporting surface 7. The other ball of each pair is supported on a sliding pestle or tappet 8.

For the measuring method, a joint element 5 is placed on the support 2 for the work piece. The cone 3 is shifted axially in such a way that the three ball-tipped contact feelers or balls 6, resting on the measuring anvils 7, are pressed into grooves 13 of the joint element 5 whereby the latter is centered in relation to the axis of the cone. The remaining three balls at this time are lowered to inoperative positions on the upper face of support 2 by lowering of the triangular plate 10.

The height position of the cone 3 corresponds to a value for the diameter determined by three grooves 13. If now the three balls 6, resting on the sliding pestles 8, are lifted up by means of plate 10, until they reach on the one hand grooves 13 of the joint member 5, and on the other hand, cone 3, then the height position of the midpoint 15 of plate 10, located in the extension of the cone axis, corresponds with the arithmetic mean of the individual groove diameters assigned to the three shiftable ball-tipped contact feelers 6, since plate 10, as shown in FIG. 2, will only apply each time to one-third of the deviation of these diameters as compared to the diameter which would be in accordance with an exactly horizontal position of the plate 10.

For the formation of the arithmetic mean in the end value, it will still be necessary to halve the difference between the values corresponding to the position of cone 3 and of plate 10 and to add this half difference to the diameter value found by cone 3 or to deduct therefrom. The measuring lever 11 will accomplish this, which in consequence of its one-sided mounting, will transfer deflections at its end only to one half to the dial gauge 12, engaging in the middle. In the end, therefore, always one-sixth of the deviation of the position of each sliding pestle 8, which results in relation to the position of cone 3, will be considered by the gauge 12.

In the embodiment of FIG. 3, which illustrates the practical execution of the measurement on a workpiece in the form of a ball sleeve 4, a differential lever system 14 is used instead of the measuring lever 11, which system scans cone 3a and plate 10a with the ends 14a and 14b of its levers. From the conditions of the levers as drawn in, it becomes clear that in this case also, only half of the movement of plate 10a is fed to the dial gauge 12b which this time has not been arranged floating, but attached to the housing 12.

Adjusting controls for the dimensional alignment of the arrangement are cylinders (without grooves) of a known diameter, that is, inside cylinders for the joint element 5 above FIG. 1 and outside cylinders for the ball sleeve 4 of FIG. 3. The free movability of the ball-tipped contact feelers 6 and 6a respectively of FIGS. 1 and 3 makes this simple structure of the adjusting controls possible.

In case of a swivel joint, the measure M of the width of the groove should amount to 30 mm for the ball hub 4 and 50 mm for the joint element 5. A (freely selected) tolerance range is designated by I class which lies between 29.7 and 30 mm for the ball hub and for the joint element between 50 and 50.3 mm. Logically, II designates the tolerance ranges between 30 and 30.3 mm or 50.3 and 50.6 mm. In the case of a measurement of the ball hub 4, the three balls 6a resting on the anvils 7a would result with the aid of the cone 3a by itself in a diameter of 30.1 mm. The positions of the sliding pestles 8a in themselves would correspond to a diameter of 29.6, 29.7 or 30.1 mm. The plate 10a allows only the average value of these, of 29.8 mm. Because of the lever ratios, the gauge 12 again records the average value 39.1 and 29.8 mm, to wit 29.95 mm. Therefore (controlled by the gauge) I is stamped into the ball hub 4. If now a measurement carried out logically for the joint element results, for example, in 50.2 mm, then in this case likewise I is stamped in. The ball hub of class I and the joint element of class I can be mounted together.

Essentially the measurement with the device of the present application is divided into two parts. First of all, the measuring device shown, for example, in FIG. 1 is used in such a way that only three ball tipped contact feelers are used which have been assigned in the direction of the periphery to every second one of the grooves 13 in the joint element 5. These feelers rest on fixed supports 7 which, in the embodiment shown, are formed by anvil-like elevations above the supporting surface 2 for the joint element 5. Understandably these fixed supports can also be formed directly by the supporting surface 2 and the decisive point is that the supporting surface 2 is formed so that radial adjustments of the joint elements 5 are possible until the axis of said part 5 coincides with the axis of the cone 3. The cone 3 is indeed supported by the said mentioned first balls 6, whereby it presses the latter radially outwardly to engage and rest on the bottoms of their respective grooves 13. Now a circle has been determined by three points, namely, the three points at which these balls engage the bottoms of their respective grooves 13. The radius of this circle corresponds in each instance to the distance of the bottom of one groove from the axis of cone 3, and correspondingly, represents a measure for the depths of the grooves. In view of the fact that the three points of contact of the balls lie on a circle common to the surfaces of these three grooves, the points of contact of the balls with the cone 3 lie on a circle concentric to the cone 3. Cone 3 is supported by the balls at a height which depends on the diameter of this circle and thus, ultimately, on the depth of the grooves 13. Therefore, in accordance with this first part of the measuring process, the diameter of that circle can be indicated by means of the dial gauge 12 which characterizes the depth of the first three grooves. In this case, therefore, a conversion of the measure of the depth of the groove extending in a plane perpendicular to the axis of cone 3 into a displacement of cone 3 with its bolt 9 in the direction of its axis takes place, which can be indicated on dial gauge 12 as a measure for this diameter.

The second step of the measuring method consists therein, while maintaining the coaxial relation of the joint element 5 and cone 3, the additional three grooves being also equipped with ball tipped contact feelers. During the first step above described, these ball tipped contact feelers were not hitherto brought to fit against the bottoms of the grooves and the surface of cone 3, since, for this purpose, the slide tappets 8 must be moved in an upward direction. If now the slide tappets 8 are moved in an upward direction, then the balls, being in contact therewith, are urged into simultaneous engagement with the bottoms of their respective grooves and against the surface of cone 3. At the same time, however, the joint element 5 and the cone 3 are both maintained against movement so that joint element 5 is not shifted on the supporting surface 2 nor is the height of cone 3 changed; the height of cone 3 and thus the axial position of bolt 9 therefore being determined now as they were before by the diameter of that circle which is defined by the points of contact between the first mentioned three balls, on the one hand, and the bottom surfaces of their respective grooves, on the other hand.

The three slide tappets 8, after having brought their assigned balls into contact with both their respective grooves 13 and the surface of cone 3, therefore are in an axial position, as to height, which depends upon the depths of their respective grooves. In the case of grooves of varying depths, the balls may compensate by movement in radial directions for varying distances. That is to say, they may roll upward or downward along the surface of cone 3. Although the height of the cone 3 will be maintained, throughout the second step, the balls assigned to the second group of grooves assume different heights depending on the depth of the grooves for each ball. But this also means, in FIG. 1, that the lower ends of the slide tappets 8 will have varying heights depending on the depth of the groove to which the ball cooperating with them each time happens to be assigned.

If now one considers the arrangement according to FIG. 1, then in this case, there is no individual measurement of the depths of the individual grooves 13, but the lower ends of all slide tappets 8 are supported by one common plate 10, which is supported by the lever arm 11 for pivotal movement about a point 15 aligned with the axis of cone 3. Therefore, it can incline around such point in accordance with relative variations in the heights of the three slide tappets 8. This inclination of plate 10 around the point 15, therefore, depends on the relative heights of the three slide tappets 8 and thus, ultimately, on the depths of the grooves 13 which are in contact with the second group of balls. The height of the point 15 on the lever 11 itself thus constitutes a measure for the mean value of the depths of these three grooves.

Therefore, while the position of height of the cone 3 was a measure for the diameter of that circle which was determined by the points of support of the first group of three balls on the bottom of the first three grooves, the height of the said point on the lever 11 is a measure for the mean value of the depths of the grooves 13 taken into account in the second measuring process. Although, therefore, a measure for the arithmetic of the mean value of all values covered during the measuring process appears on the feeler of the measuring gauge 12 resting on lever 11, namely, of the diameter of the repeatedly explained and defined circle, on the one hand, characteristic for the three grooves covered first, and the characteristic positions of height of the slide tappets 8, on the other hand, which are characteristic for the depth of the three grooves considered in the second part of the measuring process.

As is well known, by arithmetic mean value is meant the sum of the individual values divided by the number of individual values.

It will be apparent that in the first step of using the device, one ball of each of the three pairs of diametrically opposed balls 6—6 is thrust radially into engagement with the bottom of its associated slot 13 in the rotary joint element. These three balls, due to their angular spacing, serve to center the element concentrically to the cone 3 and to fixedly secure the element against radial displacement, or in other words, displacement normal to its axis and to the axis of the guide bolt 9.

As yet, the other ball of each pair is disengaged from the bottom of its slot resting loosely on the upper end of its associated sliding tappet 8 which will at this time be lowered so that each of the other balls 6 of each pair, must be raised by its sliding tappet 8 into wedging engagement with the surface of cone 3 which then urges it radially outwardly into engagement with the bottom of its respective slot. When the other balls are thus engaged with the bottom of their slots, it will be apparent that the distance between the diametrically opposed balls of each pair will be a function of the diametrical distance between the bottoms of diametrically opposed slots of each pair.

For thus engaging the said other balls with the bottoms of their associated slots, the triangular plate 10 is arranged to thrust simultaneously against the lower ends of all the sliding tappets 8 until the balls at the upper ends thereof are urged by the cone 3 into radial engagement with the bottoms of their respective slots.

The upward thrust against the plate 10 is applied at a point 15 medially of said plate, as shown in FIGS. 1 and 2, and the plate 10 is free to rock or pivot about this point to compensate for unequal movements of the respective sliding tappets 8 and their associated balls, such as will result from unequal distances between the bottoms of the respective slots 13 and the axis of the cone 3.

The vertical displacement of the medial point 15 on the plate 10 is the mean vertical displacement of the several tappets 8 and their balls 6 relative to the housing 1 or, in conjunction with the measuring levers shown in FIGS. 1 and 3, relative to the guide bolt 9 and cone 3, and corresponding with the mean radial distance between said bottoms and the axis of the cone 3. This displacement is measured by the dial gauge or other measuring and indicating instruments in dependence from the posting of the cone in the manner earlier explained in the detail. The dial gauge is indicative of the measurement owing to an appropriate scale directly in double, i.e., in the previously mentioned measure M.

The embodiments of the invention in which an exclusive property or privilege is claimed, are defined as follows:

1. An arrangement for the determination of the rotary joint elements (male and female) of shiftable synchronizing swivel joints, said elements matching one another and connected with one another by means of balls distributed evenly over the periphery in grooves, the said determination being of the arithmetic mean value of the distances between the bottoms of the grooves and the axis of each joint element, comprising a housing for the longitudinally shiftable mounting of a guide bolt which is arranged transversely with respect to a supporting surface of the housing for a joint element, said bolt having a means defining a cone shaped surface with its conical axis aligned with the bolt axis, six ball shaped contact feelers supporting said conical surface and projecting into the grooves of said joint element, three of said ball shaped contact feelers comprising balls resting on said supporting surface of the housing, said three balls being engageable by said conical surface for horizontally positioning said joint element on the supporting surface, concentrically to said conical surface; three vertical slide tappets of equal length guided in said housing for vertical shifting movement parallel to the axis of said guide bolt; the other three of said ball shaped contact feelers being supported on the upper ends respectively of said slide tappets, with each of such ball tappet contact feelers disposed between two of said first mentioned ball shaped contact feelers, said ball tappet contact feelers defining a circle coaxial with said conical axis; a generally horizontal supporting plate disposed beneath and abutting against the lower ends respectively of the said slide tappets; a measuring lever fulcrummed on said housing, said supporting plate being carried by a free end of said lever for pivotal movement about a point on said plate aligned with the axis of said conical surface; and a gauge connected to said bolt and engaging said measuring lever for indicating the displacement of said bolt and its said conical surface with respect to said point on said plate.

2. Device according to claim 1, in which the diameter of the ball tappet contact feelers corresponds to that of the engaging balls.

3. Device according to claim 1, in which the angle of the cone is 60° so that upon a shifting of the cone its path of advance and the change in distance of two opposing ball-tipped contact feelers one from the other will be equally large.

4. Device according to claim 1, in which a measuring anvil is provided on the support between each engaging ball and the support.

5. A device for measuring the diametrical distance between the bottoms of three pairs of diametrically opposed slots in a rotary joint element of a swivel joint, comprising a housing, a guide bolt mounted for longitudinal shifting movement in said housing, means defining a cone shaped surface carried at the end of said guide bolt externally of said housing with the conical axis of said surface aligned with the axis of said guide bolt, said housing being formed with a supporting horizontal surface in a radial plane of said guide bolt to support said joint element for horizontal shifting on said surface, three pairs of relatively diametrically opposed balls associated with said housing for engagement with the surface of said cone, said housing being formed with surfaces in a common horizontal plane, radial to the axis of said cone, respectively, for supporting one of the said balls of each said pair of balls in operative engagement with the surface of said cone and for reception in one of the diametrically opposed slots of each said pair of diametrically opposed slots in the joint element, whereby axial movement of said cone acts on said balls to urge each of them radially into engagement with the bottom of the groove of one of said pairs of grooves while simultaneously shifting the joint element horizontally on said surface to a position concentric to the cone, three sliding tappets of equal lengths guided for vertical movement in said housing parallel to the axis of the guide bolt, the other balls of the respective pairs being supported at the upper ends of said tappets for vertical movement therewith, into and from operative wedging engagement with the surface of said cone, a flat supporting plate abutting against the lower end of the respective tappets for transmitting upward thrusting force to said tappets to urge the said balls at the upper ends of the respective said tappets into wedging engagement with the cone for radial movement respectively into engagement with the bottom of the other slot of each said pair, vertically movable means supporting said plate for universal angular movement about a point medially thereof in vertical alignment with said guide bolt, and indicating means mounted on said bolt and contacting said means supporting said plate for indicating the vertical location of the said point with respect to said guide bolt.

* * * * *